United States Patent
Weber et al.

(10) Patent No.: US 6,820,481 B1
(45) Date of Patent: Nov. 23, 2004

(54) MASS FLOW SENSOR HAVING AN IMPROVED MEMBRANE STABILITY

(75) Inventors: Heribert Weber, Nuertingen (DE); Werner Steiner, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/699,704

(22) Filed: Oct. 30, 2000

(30) Foreign Application Priority Data

Oct. 28, 1999 (DE) .......................................... 199 52 055

(51) Int. Cl.$^7$ ................................................. G01F 1/68
(52) U.S. Cl. ................................. 73/204.26; 73/204.23
(58) Field of Search .......................... 73/204.26, 204.23, 73/204.15, 204.18, 204.24

(56) References Cited

U.S. PATENT DOCUMENTS

| | | | | |
|---|---|---|---|---|
| 4,542,650 A | * | 9/1985 | Renken et al. ................. 73/204 |
| 4,545,650 A | * | 10/1985 | Kirkman et al. ............. 359/272 |
| 4,682,503 A | * | 7/1987 | Higashi et al. ............. 257/419 |
| 5,237,867 A | * | 8/1993 | Cook, Jr. ................. 73/204.15 |
| 5,393,351 A | * | 2/1995 | Kinard et al. ............. 73/204.26 |
| 5,423,212 A | * | 6/1995 | Manaka .................... 73/204.26 |
| 5,703,287 A | * | 12/1997 | Treutler et al. .......... 73/204.26 |
| 5,852,239 A | * | 12/1998 | Sato et al. ................ 73/204.26 |
| 5,965,811 A | * | 10/1999 | Kawai et al. ............ 73/204.26 |
| 5,965,813 A | * | 10/1999 | Wan et al. ................ 73/204.15 |
| 6,240,777 B1 | * | 6/2001 | Treutler et al. .......... 73/204.11 |
| 6,290,388 B1 | * | 9/2001 | Saul et al. .................... 257/467 |
| 6,318,170 B1 | * | 11/2001 | Renninger et al. ....... 73/204.26 |

* cited by examiner

Primary Examiner—Edward Lefkowitz
Assistant Examiner—Liybett Martir
(74) Attorney, Agent, or Firm—Kenyon & Kenyon

(57) ABSTRACT

A mass flow sensor is described. To improve the membrane stability of the known mass flow sensor, in particular the reoxide layer which is present in the known mass flow sensor is replaced by a thicker PECVD silicon oxide layer. The thickness of the silicon oxide layer deposited on the platinum layer is increased, and the known mass flow sensor is also provided with a cover layer of PECVD silicon nitride forming a moisture barrier.

17 Claims, 5 Drawing Sheets

MASS FLOW SENSOR HAVING AN IMPROVED MEMBRANE STABILITY

FIELD OF THE INVENTION

The present invention relates to a mass flow sensor.

SUMMARY OF THE INVENTION

The mass flow sensor according to the present invention has the advantage over the related art of an improved membrane stability.

An important aspect of the present invention is that the stability of the membrane of the known mass flow sensor is increased by increasing the total layer thickness of a membrane according to the present invention in comparison with the known membrane.

One possibility for increasing the total layer thickness of the membrane and increasing the membrane stability of the known mass flow sensor is to arrange a moisture barrier above the metal layer of the known mass flow sensor.

In a preferred embodiment of the present invention, the top layer of the mass flow sensor, i.e., the membrane is designed as a moisture barrier in the form of a cover layer. In addition to increasing the total layer thickness and, as a result, improving membrane stability of the known membrane, this has the advantage that the penetration of moisture into the membrane and thus into the mass flow sensor is at least greatly reduced. In the case of uptake of moisture, there is the risk that one or more moisture absorbing layers might separate from the layer beneath them or the frame or their mechanical properties might be significantly impaired. Thus, the use of a moisture barrier according to the present invention has the advantage of further improving membrane stability in addition to the effect of shielding the membrane from moisture. Moisture can reach the cover layer or the membrane in particular through the atmospheric humidity present in the air that flows over the mass flow sensor.

In an advantageous embodiment of the present invention, the moisture barrier is formed by a nitride layer, which also improves the stability of the membrane according to the present invention with respect to particles in the air-flow striking the membrane. An LPCVD or PECVD nitride layer is preferably used as a moisture barrier.

As an alternative or in addition, however, the moisture barrier may also be formed by a silicon carbide layer, preferably PECVD silicon carbide, a layer of a chemically resistant metal such as platinum, gold, etc., or a layer of one or more metal oxides.

To further improve the mechanical stability of a membrane according to the present invention and/or to further improve the protection of the membrane from penetrating moisture, a top sandwich system having at least one oxide layer and at least one nitride layer is provided in the upper area of the membrane in the case of another preferred embodiment of the present invention. The sandwich system is preferably arranged above the metal layer of the membrane. For this purpose, silicon oxide and silicon nitride layers are preferably used.

As an alternative or in addition, another embodiment of the present invention provides for a bottom sandwich system having at least one oxide layer and at least one nitride layer to be deposited beneath the metal layer and above the frame of the mass flow sensor. Again in the case of this lower sandwich system, silicon oxide and silicon nitride layers are also preferably used.

The use of one or more sandwich systems in the membrane according to the present invention has the advantage that adequate protection from moisture penetrating into the sensor can be guaranteed even when the layer forming the top moisture layer is damaged. Due to the use of one or more sandwich system, it is also possible to adjust the membrane tension and the thermal conductivity of the membrane in a wide range through the various layers.

According to another preferred embodiment of the present invention, a CVD oxide layer, preferably a PECVD silicon oxide layer, is provided directly beneath the metal layer of the membrane. According to the present invention, the CVD oxide layer illustrated in FIG. 1 replaces the reoxide layer of the known membrane. Since the reoxide layer is produced by converting the surface of a silicon nitride layer into a silicon oxide layer, there are technical restrictions to the process with regard to the maximum layer thickness that can be produced. In the case of the known membrane illustrated in FIG. 1, only the reoxide layer is replaced by a thicker CVD or PECVD oxide layer, so it is easily possible according to the present invention to produce a thicker membrane in comparison with the known membrane.

Furthermore, according to the present invention, the known reoxide layer can also be replaced by a sandwich system, preferably composed of PECVD oxide layers and PECVD nitride layers, instead of a CVD oxide layer. In an especially preferred embodiment of the present invention, PECVD silicon oxide layer PECVD silicon nitride layers are deposited.

According to another especially preferred embodiment of the present invention, the LPCVD nitride layer between the frames and the reoxide layer of the known membrane in FIG. 1 is replaced by a PECVD nitride layer, preferably by a PECVD silicon nitride layer. Since the reoxide layer is also replaced in the known membrane, as mentioned above, it is possible to produce a membrane or a mass flow sensor according to the present invention as part of PECVD processes. PECVD processes for producing the membrane or sensor according to the present invention may typically be carried out at a lower temperature than is possible with LPCVD processes. An advantage of a low-temperature process such as the PECVD process, is that the development of oxygen precipitates in the silicon crystal and thus their negative effects with regard to dimensional accuracy in etching with potassium hydroxide (KOH) are greatly reduced.

DETAILED DESCRIPTION

Figure 1:
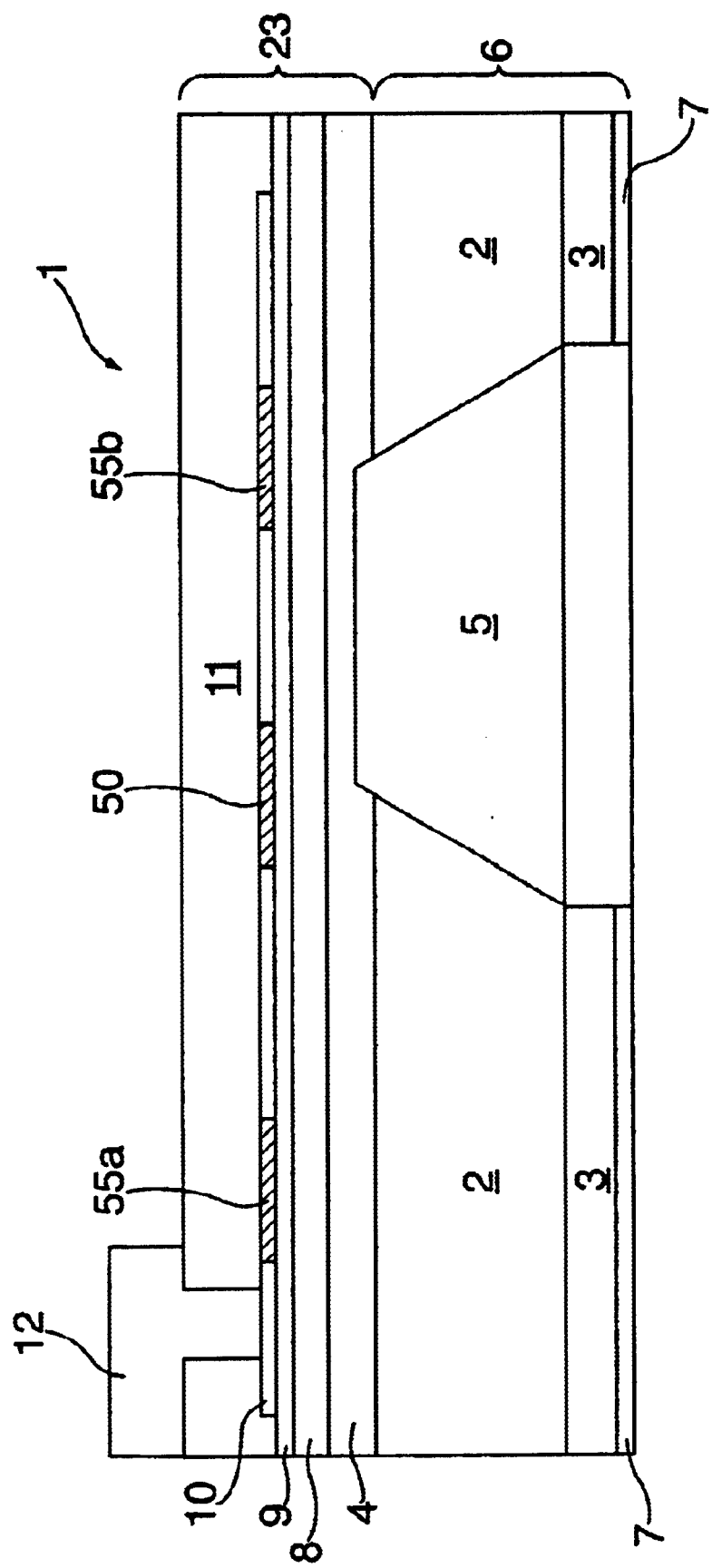
FIG. 1 shows a known semiconductor mass flow sensor having a membrane, in cross section.

Mass flow sensor 1 illustrated in FIG. 1 has a frame 6, a membrane 23 arranged on frame 6, preferably used to measure an air flow, and a metal layer, preferably a platinum layer 10, arranged in membrane 23.

To produce the known mass flow sensor 1 as illustrated in FIG. 1, a silicon substrate 2 having a (100) orientation is oxidized in a known way, e.g., in a horizontal oven, by supplying oxygen to its surfaces, forming a silicon oxide layer 3 on the front side of silicon substrate 2 and forming a silicon oxide layer 4 on the back side of silicon substrate 2.

A silicon nitride layer 7 and a silicon nitride layer 8 are deposited on the top and bottom sides of the layer system composed of silicon substrate 2, bottom silicon nitride layer 3 and top silicon nitride layer 4. In the case of known membrane 23, silicon nitride layers 7 and 8 are produced by chemical vapor deposition (CVD), more precisely by low-pressure chemical vapor deposition (LPCVD).

After the top and bottom sides have been provided with a silicon nitride layer, the surface of silicon nitride layer 8 above frame 6 is converted to a silicon oxide layer. This silicon oxide layer, which is referred to below as reoxide layer 9, forms the substrate for platinum layer 10, which covers most of reoxide layer 9.

Electrically insulated structures are produced in platinum layer 10 by etching in a known way. The structures, each of which is provided with two terminals (not shown) to establish an electric connection, form at least one heating element 50 to create a mass flow sensor and two temperature measurement elements 55a, 55b, one of which is preferably arranged at the left of the heating element and one at the right of the heating element.

Platinum layer 10 is subsequently provided with a silicon oxide layer 11 as part of another CVD process step. In the CVD process step to form silicon oxide layer 11, a plasma-enhanced chemical vapor deposition method (PECVD) is preferably used. The PECVD method is known and therefore need not be explained further here.

After coating platinum layer 10 with silicon oxide layer 11, silicon oxide layer 11 is etched so that structures provided in platinum layer 10 can be contacted electrically to form the heating element or temperature measurement element(s). After appropriate etched holes have been formed in silicon oxide layer 1 , aluminum contact terminals are produced in a known way, although FIG. 1 shows as an example only a single aluminum contact terminal 12 which contacts the structures in platinum layer 10 and functions as an external electric terminal of mass flow sensor 1.

The layer system composed of silicon substrate 2 and silicon oxide layers 3 and 4 is then etched, preferably with potassium hydroxide (KOH), to produce a recess 5 in silicon substrate 2 in the form of a truncated pyramid having a trapezoidal cross section tapering toward the membrane because of the differences in etching rates of KOH in the crystal directions of silicon, thus forming frame 6 and membrane 23.

Mass flow sensor 1 in FIG. 1 and mass flow sensors 200, 300, 400, 500 according to the present invention, as illustrated in the additional figures, are typically used in the intake duct of an internal combustion engine to measure the amount of air supplied to the internal combustion engine and its direction of flow. Since the air supplied to the internal combustion engine often contains particles, these particles may strike mass flow sensor 1 or membrane 23, resulting in destruction of membrane 23.

To counteract this problem, mass flow sensors 200, 300, 400, 500 according to the present invention, as illustrated in FIGS. 2 through 5, are each provided with a membrane 24 through 27, which have a greater mechanical stability than membrane 23 of the known mass flow sensor 1 of FIG. 1.

A sufficient stability with respect to the bombardment with particles described here can be achieved in particular by forming a membrane according to the present invention, so that its total layer thickness is greater than the total layer thickness of known membrane 23, thus achieving a sufficient mechanical stability of the membrane according the present invention and preventing rupture of the membrane.

However, it is self-evident that the total layer thickness of a membrane according to the present invention can be selected as a function of the given layer system-of the membrane or the entire sensor. The total layer thickness of a membrane according to the present invention may thus be equal to or less than that of the known membrane, if the given layer system has an adequate mechanical stability with respect to bombardment by particles as described above due to its arrangement and/or the composition of the layers forming the membrane.

The specific design of the layer sequence of a membrane according to the present invention or its thickness will of course usually depend naturally on the specific physical conditions prevailing in the intake channel into which the mass flow sensor is to be introduced.

One possibility of increasing the mechanical stability of known membrane 23 of FIG. 1 is to make one or more layers of the known membrane 23 thicker, thus yielding a greater total layer thickness of the membrane.

Figure 2:
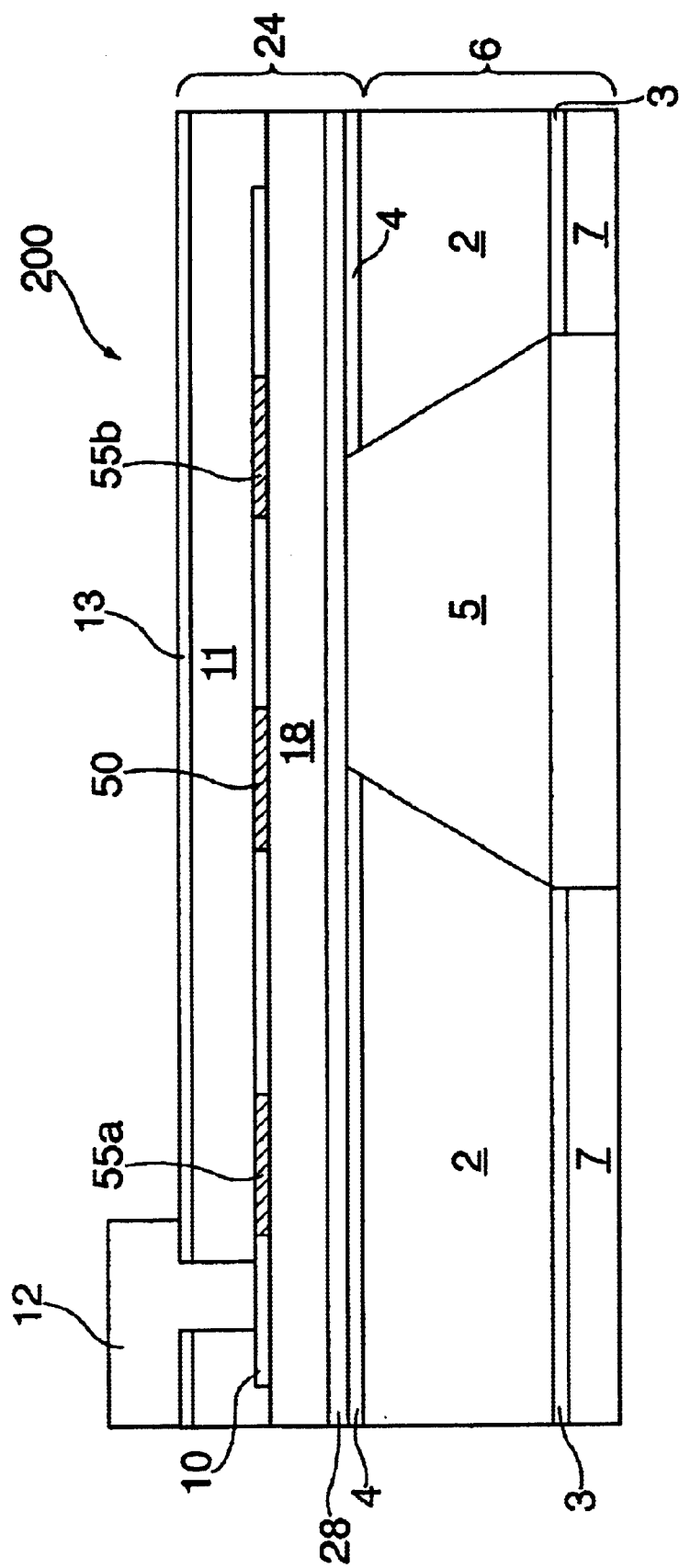
FIG. 2 shows a semiconductor mass flow sensor according to the present invention having a membrane designed with greater mechanical stability in comparison with the known membrane and having a moisture barrier arranged on the membrane, shown in cross section.

In the case of mass flow sensor 200 according to the present invention as shown in FIG. 2, silicon oxide layer 11 deposited on platinum layer 10 is preferably thicker than the corresponding silicon oxide layer 11 of the known mass flow sensor 1 according to FIG. 1.

An alternative or additional possibility for producing a thicker membrane in comparison with the known membrane is to replace reoxide layer 9 of the known membrane 23 with a thicker silicon oxide layer 18, as illustrated in FIGS. 2 through 5. Since the known reoxide layer 9 is produced by converting the surface of a silicon nitride layer to a silicon oxide layer, there are technical limits to the process with regard to the adjustable layer thickness. These limits can be overcome according to the present invention by using a silicon oxide layer 18, in particular if silicon oxide layer 18 is produced by PECVD.

However, silicon oxide, such as silicon oxide formed by PECVD, for example, has a tendency to absorb moisture and thus to lose its adhesion to the substrate or to have its mechanical properties altered. This circumstance is further promoted by a thicker silicon oxide layer. Therefore, in the embodiments illustrated in FIGS. 2 through 5, a membrane 24 through 27 is provided, having a cover layer which forms a moisture barrier 13. Preferably a silicon nitride layer which may be produced by LPCVD or by PECVD, for example, is used as the moisture barrier. The moisture barrier prevents the atmospheric humidity in the intake duct from reaching the silicon oxide layers, which are preferably thicker in comparison with the known membrane 23.

In the case of another possibility of increasing the mechanical stability of the known membrane 23 from FIG.

1, only one silicon nitride layer is deposited on known membrane 23 and the total layer thickness of the known membrane 23 is increased in this way.

Likewise, silicon oxide layer 11 of known membrane 23 can be designed to be thinner in the case of a membrane according to the present invention and the resulting membrane according to the present invention can be provided with a silicon nitride layer as a moisture barrier. This can yield a membrane according to the present invention which has a total layer thickness which is smaller than, the same as or even thicker than that of the known membrane 23.

Figure 3:
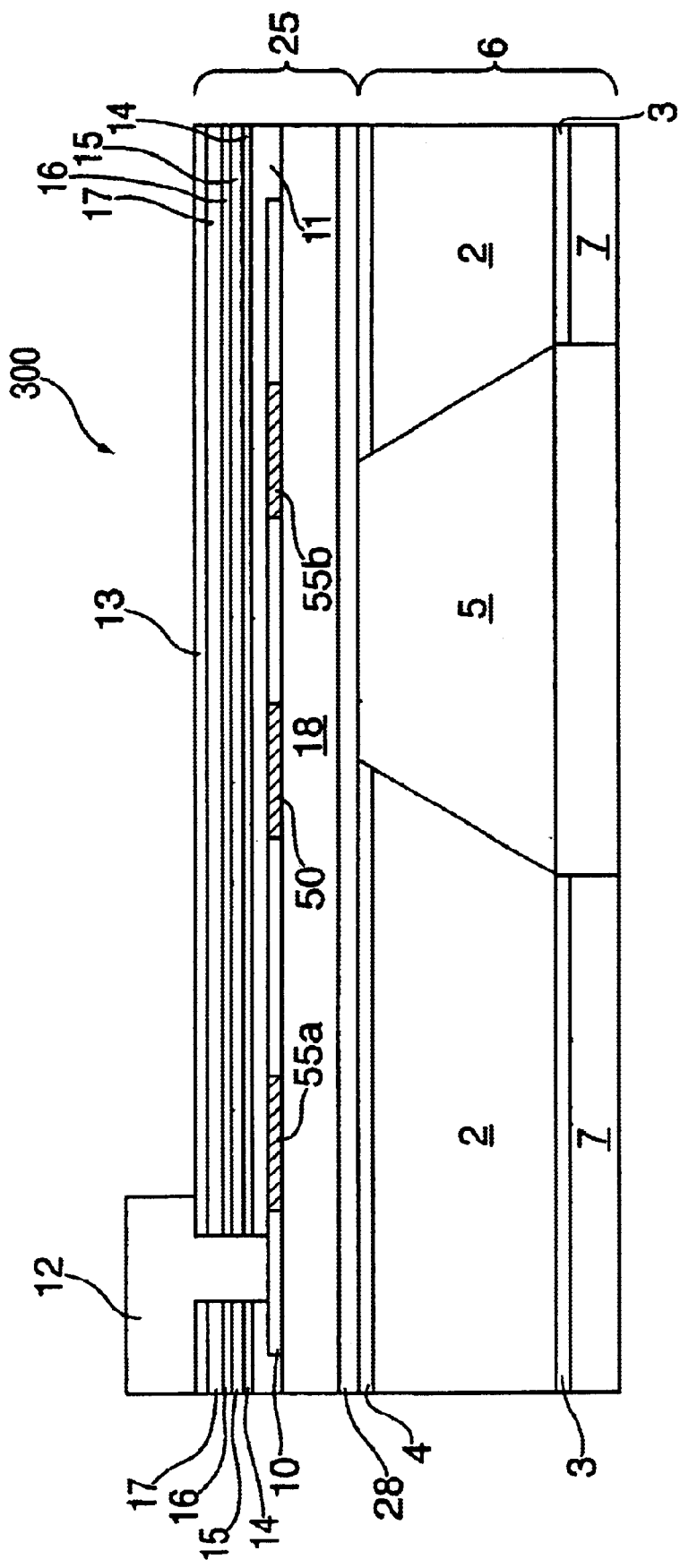
FIG. 3 shows a semiconductor mass flow sensor according to the present invention having, in contrast with the mass flow sensor illustrated in FIG. 2, a sandwich system of silicon oxide and silicon nitride layers in the upper part of the membrane, shown in cross section.

In contrast with membrane 24 in FIG. 2, membrane 25 according to the present invention as illustrated in FIG. 3 has a sandwich system of silicon oxide and silicon nitride layers in the top part of the membrane, i.e., in the part of the membrane which is above platinum layer 10. These layers are preferably also produced by PECVD. In the case of mass flow sensor 300 illustrated in FIG. 3, the sandwich system has the following sequence of layers (from bottom to top): silicon oxide layer 11, silicon nitride layer 24, silicon oxide layer 15, silicon nitride layer 16 and silicon oxide layer 17.

However, it is self-evident that the sequence of layers may also be reversed. Likewise, the sandwich system or the entire membrane 25 or part thereof may be produced by another CVD method or another deposition method.

The sandwich system provided in the top part of membrane 25 in FIG. 3 which differs from membrane 24 of FIG. 2 has the advantage that silicon nitride layers 14 and 16 form additional moisture barriers in addition to moisture barrier 13, shielding the silicon oxide layers beneath them from uptake of moisture. Because of the presence of multiple nitride layers, the sandwich system also offers effective protection against moisture penetrating into the membrane if the top silicon nitride layer 13, for example, is damaged.

Furthermore, the use of a sandwich system in the membrane makes it possible to produce layers having different layer stresses and thermal conductivities. Therefore, it is possible to produce a thick membrane having a membrane tension that can be adjusted to a defined level and having a defined thermal conductivity.

Figure 4:
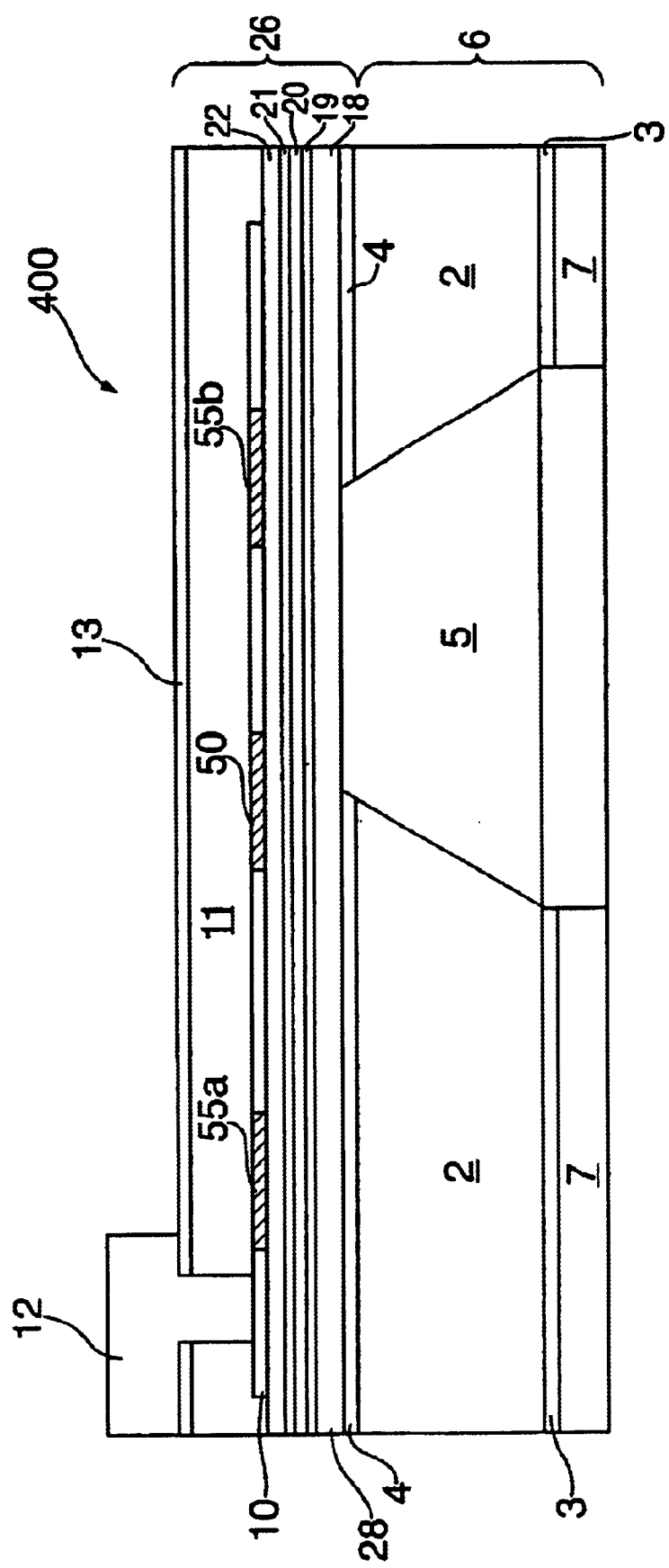
FIG. 4 shows a semiconductor mass flow sensor according to the present invention, where the sandwich system shown in FIG. 3 is not arranged in the top part of the membrane but instead is provided in the bottom part, shown in cross section.

In the case of mass flow sensor 400 in FIG. 4, in deviation from the mass flow sensor illustrated in FIG. 3, a sandwich system is provided in the bottom part of membrane 26 according to the present invention as an alternative. The sandwich system produced by coating beneath platinum layer 10 in FIG. 4 is identical to the sandwich system illustrated in FIG. 3 except for this difference and has the following sequence of layers (from bottom to top) directly above silicon nitride layer 8: silicon oxide layer 18, silicon nitride layer 19, silicon oxide layer 20, silicon nitride layer 21 and silicon oxide layer 22. Platinum layer 10 follows directly above silicon oxide layer 22.

This embodiment of a membrane according to the present invention having a lower sandwich system as an alternative to FIG. 3 has largely the same advantages as the sandwich system illustrated in FIG. 3.

Figure 5:
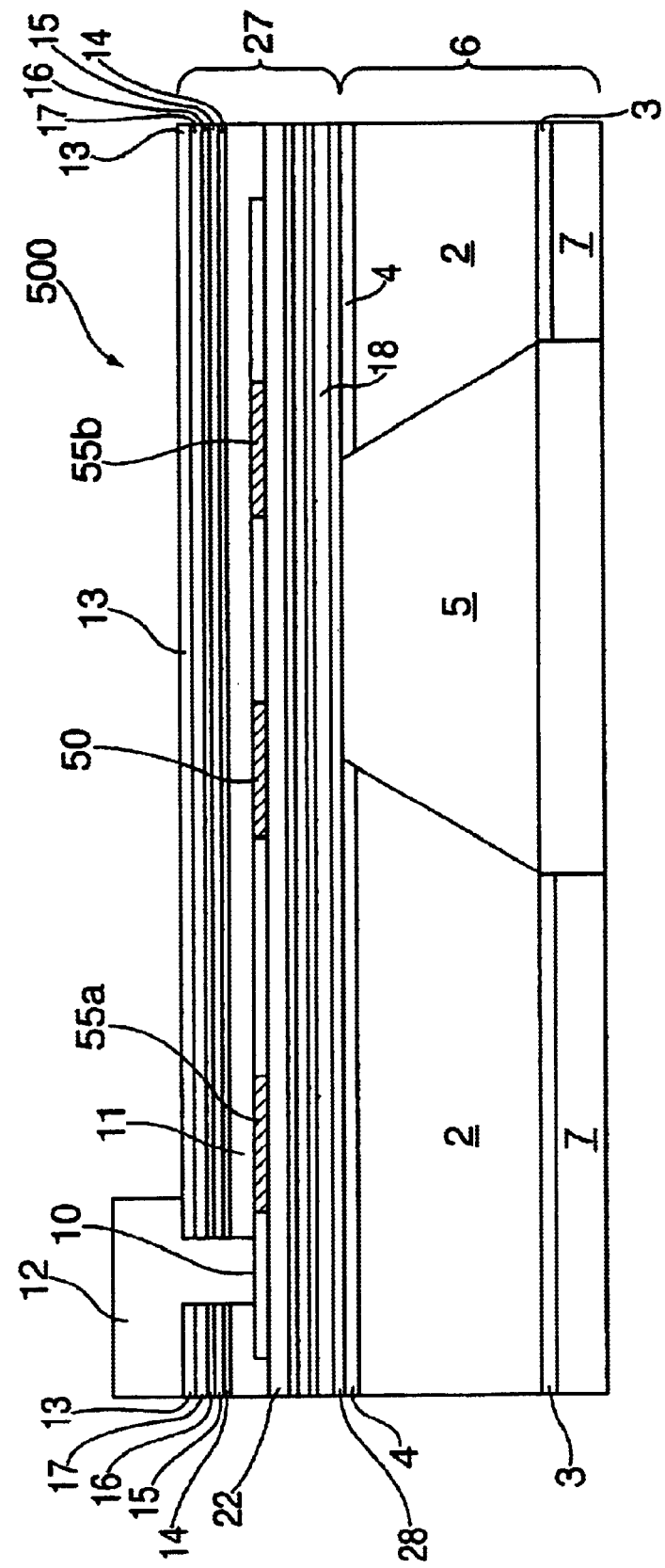
FIG. 5 shows a semiconductor mass flow sensor according to the present invention, where a sandwich system as illustrated in FIGS. 3 and 4 is provided in both the top and bottom parts of the membrane, shown in cross section.

In the case of mass flow sensor 500 illustrated in FIG. 5, a sandwich system is provided both in the area of a membrane 27 according to the present invention located directly above platinum layer 10, as is the case in FIG. 3, and between silicon nitride layer 8 and platinum layer 10, as shown in FIG. 4. Otherwise, mass flow sensor 500 illustrated in FIG. 5 corresponds to mass flow sensors 300 and 400 shown in FIGS. 3 and 4. Therefore, this membrane 27 also has the advantages mentioned in conjunction with the formation of a membrane having a sandwich system. It is self-evident that the arrangement of two sandwich systems can yield a further improvement in shielding against moisture penetrating from the outside into the membrane as well as an improved possibility of adjusting the membrane tension.

Instead of a sandwich system of PECVD silicon oxide and PECVD silicon nitride, silicon oxide layers produced by different (CVD) deposition methods (LPCVD, APCVD, etc.) and having different layer tensions may also be used, thus also making it possible to adjust the membrane tension in a wide range. A sandwich system of silicon oxide layers having different layer tensions may also be combined with a cover layer of LPCVD or PECVD silicon nitride. The silicon oxide layers of the sandwich system are preferably PECVD silicon oxide layers.

In another advantageous embodiment of the present invention, silicon nitride layer 8 of known membrane 23 in FIG. 1 is produced not by LPCVD but instead by PECVD. The PECVD silicon nitride layers according to the present invention as shown in FIGS. 2 through 5 are labeled as 28.

Since PECVD for production of silicon nitride layers or silicon oxide layers typically takes place at a lower temperature than LPCVD or thermal oxidation, a membrane according to the present invention can be produced at a lower temperature. This reduces the development of oxygen precipitates in the silicon crystal, thus permitting steeper and more uniform etching flanks in etching with potassium hydroxide (KOH) or other types of wet chemical etching of silicon. This results in a more uniform transition between the silicon substrate and the membrane in the membrane clamping area, which has a positive effect on membrane stability.

Furthermore, only a one-step KOH etching process is used to produce a mass flow sensor according to the present invention if oxide 4 is completely removed in recessed area 5, and nitride layer 28 is designed to resist KOH.

List of reference numbers:

1 mass flow sensor
2 silicon substrate
3 silicon oxide layer
4 silicon oxide layer
5 recess
6 frame
7 silicon nitride layer
8 LPCVD silicon nitride layer
9 reoxide layer
10 platinum layer
11 silicon oxide layer
12 aluminum contact terminal
13 moisture barrier
14 silicon nitride layer
15 silicon oxide layer
16 silicon nitride layer
17 silicon oxide layer
18 silicon oxide layer
19 silicon nitride layer
20 silicon oxide layer
21 silicon nitride layer
22 silicon oxide layer
23 membrane
24 membrane
25 membrane
26 membrane
27 membrane
28 PECVD silicon nitride layer
200 mass flow sensor 300 mass flow sensor
400 mass flow sensor
500 mass flow sensor

What is claimed is:

1. A mass flow sensor, comprising:
   a frame formed at least in part by silicon;
   a membrane held by the frame;
   a metal layer including a first structure and a second structure and being arranged above the frame;
   a heating element formed by the first structure in the metal layer;
   at least one temperature measurement element formed by the second structure in the metal layer; and
   a moisture barrier arranged above the metal layer and formed at least in part by a nitride layer,
   wherein the moisture barrier is formed at least in part by a top sandwich system including at least one first silicon oxide layer and at least one first silicon nitride layer.

2. The mass flow sensor according to claim 1, wherein:
   the nitride layer is a silicon nitride layer.

3. The mass flow sensor according to claim 2, wherein:
   the nitride layer is formed by an operation selected from the group consisting of a PECVD operation, a LPCVD operation, and a CVD operation.

4. The mass flow sensor according to claim 1, wherein:
   the moisture barrier forms a top layer of the mass flow sensor.

5. The mass flow sensor according to claim 4, wherein:
   the moisture barrier is formed at least in part by a bottom sandwich system,
   the bottom sandwich system is arranged beneath the metal layer and includes at least one second silicon oxide layer and at least one second silicon nitride layer.

6. The mass flow sensor according to claim 5, wherein:
   at least one of the top sandwich system and the bottom sandwich system includes at least one silicon carbide layer.

7. The mass flow sensor according to claim 1, further comprising:
   a silicon oxide layer arranged directly beneath the metal layer.

8. The mass flow sensor according to claim 1, further comprising:
   a further nitride layer arranged between the frame and the metal layer.

9. The mass flow sensor according to claim 8, further comprising:
   a silicon oxide layer formed by a thermal oxidation and arranged between the further nitride layer.

10. The mass flow sensor according to claim 9, wherein:
    the further nitride layer includes a silicon nitride layer.

11. The mass flow sensor according to claim 9, further comprising:
    an oxide layer arranged in a recess area beneath the further nitride layer.

12. The mass flow sensor according to claim 9, further comprising:
    an oxide layer arranged in the membrane and below the metal layer; and
    a recess arranged beneath the further nitride layer;
    wherein the recess does not contain the oxide layer.

13. A mass flow sensor, comprising:
    a frame formed at least in part by silicon;
    a membrane held by the frame;
    a metal layer arranged above the frame;
    a heating element formed by a first stricture in the metal layer; and
    at least one temperature measurement element formed by a second structure in the metal layer, wherein at least one of:
       a top sandwich system including at least one first silicon oxide layer between at least two first silicon nitride layers is formed above the metal layer; and
       a bottom sandwich system including at least one second silicon oxide layer between at least two second silicon nitride layers is provided below the metal layer.

14. The mass flow sensor as recited in claim 13, wherein at least one of the top and bottom sandwich system includes:
    a silicon oxide layer;
    a silicon nitride layer on top of the silicon oxide layer;
    another silicon oxide layer on top of the silicon nitride layer;
    another silicon nitride layer on top of the other silicon oxide layer; and
    a further silicon oxide layer on top of the other silicon nitride layer.

15. The mass flow sensor as recited in claim 13, wherein:
    the bottom sandwich system in an area of the frame includes a silicon oxide layer as the bottom layer; and
    the silicon oxide layer is removed in a recess area.

16. The mass flow sensor as recited in claim 13, wherein at least one layer is formed by one of a PECVD operation, an LPCVD operation, and another CVD operation.

17. The mass flow sensor as recited in claim 13, wherein at least one of the top and bottom sandwich systems includes a silicon carbide layer.

* * * * *